(12) United States Patent
Slavenburg et al.

(10) Patent No.: US 9,164,288 B2
(45) Date of Patent: Oct. 20, 2015

(54) SYSTEM, METHOD, AND COMPUTER PROGRAM PRODUCT FOR PRESENTING STEREOSCOPIC DISPLAY CONTENT FOR VIEWING WITH PASSIVE STEREOSCOPIC GLASSES

(75) Inventors: Gerrit A. Slavenburg, Fremont, CA (US); Thomas F. Fox, Palo Alto, CA (US)

(73) Assignee: NVIDIA Corporation, Santa Clara, CA (US)

( * ) Notice: Subject to any disclaimer, the term of this patent is extended or adjusted under 35 U.S.C. 154(b) by 584 days.

(21) Appl. No.: 13/444,783

(22) Filed: Apr. 11, 2012

(65) Prior Publication Data
US 2013/0271582 A1   Oct. 17, 2013

(51) Int. Cl.
H04N 13/04 (2006.01)
G02B 27/26 (2006.01)
G06T 15/00 (2011.01)
G02B 27/22 (2006.01)

(52) U.S. Cl.
CPC ............ G02B 27/26 (2013.01); H04N 13/0434 (2013.01); *G02B 27/2264* (2013.01)

(58) Field of Classification Search
CPC .. G02B 27/2228; G02B 27/22; G02F 1/1313; G02F 1/1335; G06T 15/00; H04N 13/04; G09G 5/02; G09G 3/00
USPC ......................................... 348/58, 42, 51, 47
See application file for complete search history.

(56) References Cited

U.S. PATENT DOCUMENTS 4,912,557 A   3/1990 Faroudja
5,486,868 A   1/1996 Shyu et al.
5,568,314 A   10/1996 Omori et al.
5,796,373 A   8/1998 Ming-Yen
5,878,216 A   3/1999 Young et al.
(Continued)

FOREIGN PATENT DOCUMENTS

CN   101371292 A   2/2009
CN   101415126 A   4/2009
(Continued)

OTHER PUBLICATIONS i-O Display Systems, "Featured Products," retrieved from http://web.archive.org/web/20060812053513/http://www.i-glassesstore.com/index.html on Aug. 12, 2006.
(Continued)

*Primary Examiner* — Dave Czeka
*Assistant Examiner* — Dramos I Kalapodas
(74) *Attorney, Agent, or Firm* — Zilka-Kotab, PC

(57) ABSTRACT

The presentation of stereoscopic display content for viewing with passive glasses and full resolution is provided. In use, (a) a frame of stereoscopic display content intended for viewing by one eye of a user is scanned, using a display layer of a display device; (b) the scanned frame is polarized utilizing a polarizing layer of the display device, according to a polarization associated with a lens of stereoscopic glasses worn over the same one eye of the user; (c) a backlight is activated to illuminate the polarized frame, in response to an entirety of the polarized frame being scanned; (d) the display device is held for a predetermined period of time in response to activation of the backlight, and then the backlight is de-activated; and (a)-(d) are then repeated for the other eye of the user, with another frame of stereoscopic display content intended for viewing by the other eye.

11 Claims, 7 Drawing Sheets

(56) References Cited

U.S. PATENT DOCUMENTS

| | | | |
|---|---|---|---|
| 5,943,504 A | 8/1999 | Flurry et al. | |
| 5,963,200 A | 10/1999 | Deering et al. | |
| 5,976,017 A | 11/1999 | Omori et al. | |
| 6,002,518 A | 12/1999 | Faris | |
| 6,011,581 A | 1/2000 | Swift et al. | |
| 6,529,175 B2 | 3/2003 | Tserkovnyuk et al. | |
| 6,532,008 B1 | 3/2003 | Guralnick | |
| 6,977,629 B2 | 12/2005 | Weitbruch et al. | |
| 7,061,477 B1 | 6/2006 | Noguchi | |
| 7,103,702 B2 | 9/2006 | Funamoto | |
| 7,215,356 B2 | 5/2007 | Lin et al. | |
| 7,256,791 B2 | 8/2007 | Sullivan et al. | |
| 7,385,625 B2 | 6/2008 | Ohmura et al. | |
| 7,490,296 B2 | 2/2009 | Feldman et al. | |
| 7,502,010 B2 | 3/2009 | Kirk | |
| 7,724,211 B2 | 5/2010 | Slavenburg et al. | |
| 8,169,467 B2 | 5/2012 | Slavenburg et al. | |
| 8,274,448 B1 | 9/2012 | Cook | |
| 8,363,096 B1* | 1/2013 | Aguirre | 348/57 |
| 8,482,605 B2 | 7/2013 | Myokan | |
| 8,576,208 B2 | 11/2013 | Slavenburg et al. | |
| 8,581,833 B2 | 11/2013 | Slavenburg et al. | |
| 8,581,837 B2 | 11/2013 | Amroun et al. | |
| 8,872,754 B2* | 10/2014 | Slavenburg | G02B 27/017 345/102 |
| 8,878,904 B2* | 11/2014 | Slavenburg | G09G 3/003 345/213 |
| 9,094,676 B1* | 7/2015 | Schutten | H04N 13/0429 1/1 |
| 2002/0007723 A1 | 1/2002 | Ludwig | |
| 2002/0196199 A1 | 12/2002 | Weitbruch et al. | |
| 2003/0030608 A1 | 2/2003 | Kurumisawa et al. | |
| 2003/0038807 A1 | 2/2003 | Demos et al. | |
| 2003/0234892 A1 | 12/2003 | Hu et al. | |
| 2004/0130645 A1 | 7/2004 | Ohmura et al. | |
| 2006/0012676 A1* | 1/2006 | Tomita | 348/51 |
| 2006/0146003 A1 | 7/2006 | Diefenbaugh et al. | |
| 2006/0268104 A1* | 11/2006 | Cowan et al. | 348/42 |
| 2007/0091058 A1 | 4/2007 | Nam et al. | |
| 2007/0165942 A1 | 7/2007 | Jin et al. | |
| 2007/0229395 A1 | 10/2007 | Slavenburg et al. | |
| 2007/0229487 A1 | 10/2007 | Slavenburg et al. | |
| 2007/0247478 A1 | 10/2007 | Hagino et al. | |
| 2008/0192034 A1 | 8/2008 | Chen et al. | |
| 2008/0252578 A1* | 10/2008 | Kim et al. | 345/87 |
| 2009/0122052 A1 | 5/2009 | Huang et al. | |
| 2009/0132951 A1 | 5/2009 | Feldman et al. | |
| 2009/0150776 A1 | 6/2009 | Feldman et al. | |
| 2009/0150777 A1 | 6/2009 | Feldman et al. | |
| 2009/0179845 A1* | 7/2009 | Song et al. | 345/90 |
| 2010/0020062 A1 | 1/2010 | Liou et al. | |
| 2010/0033555 A1 | 2/2010 | Nagase et al. | |
| 2010/0045690 A1 | 2/2010 | Handschy et al. | |
| 2010/0066820 A1* | 3/2010 | Park et al. | 348/53 |
| 2010/0194733 A1 | 8/2010 | Lin et al. | |
| 2010/0201791 A1 | 8/2010 | Slavenburg et al. | |
| 2010/0208043 A1 | 8/2010 | Hoffman | |
| 2010/0225682 A1* | 9/2010 | Nakahata | 345/695 |
| 2010/0231696 A1 | 9/2010 | Slavenburg et al. | |
| 2010/0231698 A1 | 9/2010 | Nakahata et al. | |
| 2010/0253665 A1 | 10/2010 | Choi et al. | |
| 2010/0289883 A1 | 11/2010 | Goris et al. | |
| 2011/0012904 A1 | 1/2011 | Slavenburg et al. | |
| 2011/0018980 A1* | 1/2011 | Lin | 348/53 |
| 2011/0032440 A1* | 2/2011 | Robinson et al. | 349/15 |
| 2011/0063424 A1* | 3/2011 | Matsuhiro et al. | 348/58 |
| 2011/0074773 A1* | 3/2011 | Jung | 345/419 |
| 2011/0090319 A1 | 4/2011 | Kim et al. | |
| 2011/0109656 A1 | 5/2011 | Nakagawa et al. | |
| 2011/0109733 A1 | 5/2011 | Kim et al. | |
| 2011/0115994 A1* | 5/2011 | Jung et al. | 349/15 |
| 2011/0148860 A1* | 6/2011 | Tsai et al. | 345/419 |
| 2011/0157332 A1* | 6/2011 | Kim et al. | 348/56 |
| 2011/0187705 A1* | 8/2011 | Lan et al. | 345/419 |
| 2011/0205335 A1 | 8/2011 | Kim et al. | |
| 2011/0205625 A1* | 8/2011 | Auld | 359/465 |
| 2011/0221747 A1* | 9/2011 | Kim et al. | 345/419 |
| 2011/0267341 A1* | 11/2011 | Jung et al. | 345/419 |
| 2011/0310234 A1 | 12/2011 | Sarma et al. | |
| 2012/0002123 A1* | 1/2012 | Kang | 349/15 |
| 2012/0007970 A1* | 1/2012 | Ko | 348/56 |
| 2012/0013614 A1* | 1/2012 | Matsuhiro et al. | 345/419 |
| 2012/0019637 A1* | 1/2012 | Ko et al. | 348/56 |
| 2012/0033053 A1 | 2/2012 | Park et al. | |
| 2012/0038624 A1* | 2/2012 | Slavenburg | H04N 13/0497 345/419 |
| 2012/0075437 A1 | 3/2012 | Slavenburg et al. | |
| 2013/0038684 A1 | 2/2013 | Slavenburg | |

FOREIGN PATENT DOCUMENTS

| | | |
|---|---|---|
| CN | 101697595 A | 4/2010 |
| CN | 101860766 A | 10/2010 |
| CN | 102034449 A | 4/2011 |
| CN | 102055993 A | 5/2011 |
| CN | 102111627 A | 6/2011 |
| CN | 102160386 A | 8/2011 |
| CN | 102378028 A | 3/2012 |
| EP | 1363264 A2 | 11/2003 |
| EP | 2228998 A2 | 9/2010 |
| EP | 2262272 A2 | 12/2010 |
| EP | 2339864 A2 | 6/2011 |
| EP | 2362666 A1 | 8/2011 |
| EP | 2365697 A2 | 9/2011 |
| GB | 2475367 A | 5/2011 |
| JP | 01073892 A2 | 3/1989 |
| JP | H09051552 | 2/1997 |
| JP | 2000004451 A | 1/2000 |
| JP | 2000284224 A | 10/2000 |
| JP | 2001045524 A | 2/2001 |
| JP | 2001154640 A | 6/2001 |
| JP | 2003202519 A | 7/2003 |
| JP | 2007110683 A | 4/2007 |
| JP | 2007114793 A | 5/2007 |
| JP | 2009152897 A | 7/2009 |
| KR | 20040001831 A | 1/2004 |
| KR | 20060007662 A | 1/2006 |
| KR | 20070077863 A | 7/2007 |
| KR | 20070115524 A | 12/2007 |
| KR | 20100022653 A | 3/2010 |
| KR | 20100032284 A | 3/2010 |
| KR | 20100035774 A | 4/2010 |
| TW | 550519 B | 9/2003 |
| WO | 9931884 A1 | 6/1999 |
| WO | 2007126904 A2 | 11/2007 |
| WO | 2009069026 A2 | 6/2009 |
| WO | 2010032927 A2 | 3/2010 |
| WO | 2010064557 A1 | 6/2010 |
| WO | 2010107227 A2 | 9/2010 |
| WO | 2011028065 A2 | 3/2011 |

OTHER PUBLICATIONS

Notice of Allowance from U.S. Appl. No. 11/462,535, dated Mar. 2, 2012.

Non-Final Office Action from U.S. Appl. No. 11/462,535, dated Oct. 26, 2011.

Non-Final Office Action from U.S. Appl. No. 11/462,535, dated May 24, 2011.

U.S. Appl. No. 13/208,290, filed Aug. 11, 2011.

Office Action from Chinese Application No. 200780001629.6 mailed on Feb. 24, 2010.

Notice of Allowance and Fee(s) Due from U.S. Appl. No. 11/462,529 dated Feb. 8, 2010.

Final Office Action from U.S. Appl. No. 11/462,529 dated Dec. 2, 2009.

International Preliminary Report on Patentability from PCT Application No. PCT/US2007/007702 issued on Sep. 30, 2008.

Non-Final Office Action from U.S. Appl. No. 11/462,529 dated Apr. 16, 2009.

International Search Report and Written Opinion from PCT Application No. PCT/US2007/007702 mailed on Apr. 2, 2008.

(56) References Cited

OTHER PUBLICATIONS

Non-Final Office Action from U.S. Appl. No. 12/854,100 dated Mar. 16, 2012.
Non-Final Office Action from U.S. Appl. No. 12/787,346 dated Jun. 8, 2012.
Notice of Grant of Patent Right for Invention from Chinese Patent Application No. 201010522450.9 dated Jul. 19, 2012 (Translation Only).
Office Action from Chinese Patent Application No. 201010522450.9 dated Dec. 23, 2011.
Notice of Allowance from Taiwan Patent Application No. 096111054 dated Feb. 29, 2012.
Notice of Allowance from Korean Patent Application No. 10-2007-0031168 dated Jan. 13, 2011.
Combined Search and Examination Report from UK Patent Application No. GB1112746.1 dated Nov. 10, 2011.
Non-Final Office Action from U.S. Appl. No. 12/765,771 dated May 25, 2012.
Office Action from Canadian Patent Application No. 2,646,439 dated Oct. 28, 2011.
Examination Report from European Patent Application No. 07 754 251.2 dated Dec. 7, 2010.
Office Action from Taiwan Patent Application No. 096111054 dated Oct. 31, 2011.
Notice of Allowance from Korean Patent Application No. 10-2010-0092504 dated Sep. 28, 2011.
Decision to Grant from Japanese Patent Application No. 2009-502980 dated Sep. 20, 2011.
Notice of Reasons for Rejection from Japanese Application No. 2009-502980 mailed Feb. 8, 2011.
Notice of Preliminary Rejection from Korean Application No. 10-2010-0092504 mailed Dec. 28, 2010.
Notice of Preliminary Rejection from Korean Application No. 10-2007-0031168 mailed Jul. 22, 2010.
Extended European Search Report from Application No. 07754251.2 mailed Sep. 9, 2009.
Final Notice of Reasons for Rejection from Japanese Application No. 2009-502980 mailed Jun. 21, 2011.
International Telecommunication Union: "Characteristics of B,G/PAL and M/NTSC Television Systems (Excerpt from ITU-R BT.470-5 Conventional Television Systems)", Feb. 1998, retrieved from http://www.kolumbus.fi/pami1/video/pal_ntsc.html on Jun. 8, 2011, (5 pages).
Video Electronics Standards Association (VESA), "Coordinated Video Timings (CVT) Standard V1.1", Sep. 10, 2003, Milpitas, CA, USA, retrieved from http://web.archive.org/web/20040204215505/http://www.vesa.org/summary/sumcvt.htm on Jun. 8, 2011, (6 pages).
Notice of Grant of Patent Right for Invention from Chinese Application No. 200780001629.6 issued Aug. 13, 2010.
Notice of Preliminary Rejection from Korean Patent Application No. 10-2011-0078998, dated Aug. 10, 2012.
Final Office Action from U.S. Appl. No. 12/854,100 dated Aug. 27, 2012.
Final Office Action from U.S. Appl. No. 12/765,771, dated Jan. 7, 2013.
Notice of Allowance from U.S. Appl. No. 12/765,771, dated Jun. 24, 2013.
Advisory Action from U.S. Appl. No. 12/765,771, dated Apr. 25, 2013.
Office Action from Taiwan Patent Application No. 101105435, dated Jan. 10, 2014.
Final Office Action from U.S. Appl. No. 12/787,346, dated Jan. 9, 2013.
Notice of Allowance from U.S. Appl. No. 12/787,346, dated Jul. 9, 2013.
Advisory Action from U.S. Appl. No. 12/787,346, dated Apr. 25, 2013.
Non-Final Office Action from U.S. Appl. No. 12/892,147, dated Dec. 31, 2012.
Non-Final Office Action from U.S. Appl. No. 12/892,147, dated Dec. 5, 2013.
Final Office Action from U.S. Appl. No. 12/892,147, dated Sep. 4, 2013.
Notice of Allowance from U.S. Appl. No. 12/892,147, dated Jul. 18, 2014.
Decision to Refuse from European Patent Application No. 07754251.2, dated Apr. 11, 2013.
Summons to Attend Oral Proceedings from European Patent Application No. 07754251.2, dated Oct. 8, 2012.
Final Office Action from U.S. Appl. No. 13/311,451, dated Jun. 5, 2013.
Notice of Allowance from U.S. Appl. No. 13/311,451, dated Mar. 12, 2014.
Non-Final Office Action from U.S. Appl. No. 13/311,451, dated Oct. 22, 2013.
Non-Final Office Action from U.S. Appl. No. 13/311,451, dated Nov. 21, 2012.
Advisory Action from U.S. Appl. No. 13/311,451, dated Sep. 6, 2013.
Advisory Action from U.S. Appl. No. 12/854,100, dated Nov. 21, 2012.
Final Office Action from U.S. Appl. No. 12/854,100, dated Sep. 11, 2014.
Non-Final Office Action from U.S. Appl. No. 12/854,100, dated May 8, 2014.
Advisory Action from U.S. Appl. No. 13/208,290, dated Aug. 7, 2014.
Final Office Action from U.S. Appl. No. 13/208,290, dated Jun. 4, 2014.
Non-Final Office Action from U.S. Appl. No. 131208,290, dated Dec. 5, 2013.
Decision on Rejection from Chinese Application No. 201110227831.9, dated Jul. 3, 2014.
Office Action from Chinese Application No. 201110227831.9, dated Sep. 13, 2013.
Examination Report from German Patent Application No. 10 2011 080 776.4, dated Sep. 18, 2013.
Examination Report from GB Patent Application No. GB1112746.1, dated Jul. 25, 2013.
Final Rejection from Japanese Patent Application No. 2011-161191, dated Jun. 3, 2014.
Notice of Reasons for Rejection from Japanese Patent Application No. 2011-161191, dated Dec. 18, 2012.
Office Action from Japanese Patent Application No. 2011-161191, dated Sep. 17, 2013.
Notice of Allowance from Korean Patent Application No. 10-2011-0078998, dated Jul. 24, 2013.
Notice of Final Rejection from Korean Patent Application No. 10-2011-0078998, dated Mar. 28, 2013.
Non-Final Office Action from U.S. Appl. No. 13/248,960, dated Aug. 1, 2014.
Non-Final Office Action from U.S. Appl. No. 13/247,907, dated Sep. 10, 2014.
Office Action from Chinese Patent Application No. 201310125583.6, dated Dec. 17, 2014.
Chen, Chun-Ho et al., "3-D Mobile Display Based on Moire-Free Dual Directional Backlight and Driving Scheme for Image Crosstalk Reduction," Journal of Display Technology, vol. 4, No. 1, Mar. 2008, pp. 92-96.
Schutten, R. et al., U.S. Appl. No. 13/247,907, filed Sep. 28, 2011.
Schutten, R. et al., U.S. Appl. No. 13/248,960, filed Sep. 29, 2011.
Cook, D., U.S. Appl. No. 11/532,005, filed Sep. 14, 2006.
Slavenburg, G., U.S. Appl. No. 13/248,960, filed Sep. 29, 2011.
Cook, D., U.S. Appl. No. 11/531,995, filed Sep. 14, 2006.
Slavenburg, G., U.S. Appl. No. 61/387,947, filed Sep. 29, 2010.
Schutten, R., U.S. Appl. No. 61/387,948, filed Sep. 29, 2010.
Slavenburg, G. A., U.S. Appl. No. 12/901,447, filed Oct. 8, 2010.
Non-Final Office Action from U.S. Appl. No. 12/854,100, dated Mar. 6, 2015.
Notice of Allowance from U.S. Appl. No. 13/248,960, dated Apr. 21, 2015.
Notice of Allowance from U.S. Appl. No. 13/247,907, dated Mar. 19, 2015.
Office Action from Chinese Application No. 201110227831.9, dated Jun. 23, 2015.
Final Office Action from U.S. Appl. No. 12/854,100, dated Aug. 6, 2015.

* cited by examiner

SYSTEM, METHOD, AND COMPUTER PROGRAM PRODUCT FOR PRESENTING STEREOSCOPIC DISPLAY CONTENT FOR VIEWING WITH PASSIVE STEREOSCOPIC GLASSES

FIELD OF THE INVENTION

The present invention relates to video displays, and more particularly to displaying stereo content utilizing video displays.

BACKGROUND

Various display devices are equipped for both mono and stereo viewing. Unlike mono viewing, stereo viewing involves the display of separate content for the right and left human eye. Specifically, such stereo viewing requires the presentation of a left image to the left human eye and a right image to the right human eye. Numerous technologies are capable of providing such stereo viewing.

For example, in some display systems a polarizing layer is included as a component of a display screen for polarizing even scan lines of the display screen in a first direction specific to a lens of passive glasses worn over an eye of a viewer, such that the eye of the viewer is capable of viewing the even scan lines and not the odd scan lines. Similarly, the polarizing layer polarizes odd scan lines of the display screen in a second direction opposite the first direction which is specific to a lens of the passive glasses worn over the other eye of the viewer, such that the other eye of the viewer is capable of viewing the odd scan lines and not the even scan lines. However, as a result of dedicating odd scan lines to one image and even scan lines to another image, the images are provided in half the resolution of the display screen. Additional limitations of this technique includes some textual elements being visible only for one eye and some being visible only for the other eye, making text hard to read, a limited vertical viewing angle (i.e. mid-screen) for the viewer in order to avoid ghosting, and high cost due to the required precision of alignment of the polarizing layer with the pixel structure of the display screen (i.e. to ensure that the correct scan lines are polarized as intended).

In the alternative, other display systems may implement time sequential display of stereo content, such that left and right images are presented in an alternating manner. With respect to such display systems, the viewer wears active shutter glasses in which a shutter of each lens of the glasses may be independently controlled. In particular, when an image intended for viewing by a left eye of the viewer is displayed, the active shutter glasses are controlled to open a shutter of a left lens of the glasses and to close a shutter of a right lens of the glasses, such that the left eye is capable of viewing the image and the right eye is prevented from viewing the image. Similarly, when an image intended for viewing by a right eye of the viewer is displayed, the active shutter glasses are controlled to open a shutter of a right lens of the glasses and to close a shutter of a left lens of the glasses, such that the right eye is capable of viewing the image and the left eye is prevented from viewing the image.

While the display systems involving active shutter glasses provide full resolution images, and thus do not have the half resolution problem of the polarization techniques mentioned above, the active shutter glasses themselves have conventionally been expensive, require a battery, are heavier than passive glasses, and have been limited style-wise. There is thus a need for addressing these and/or other issues associated with the prior art.

SUMMARY

A system, method, and computer program product are provided for presenting stereoscopic display content for viewing with passive glasses at full resolution. In one embodiment, as a first step (a) a frame of stereoscopic display content intended for viewing by one eye of a user is scanned, using a display layer of a display device. Additionally, as a second step (b) the scanned frame is polarized utilizing a polarizing layer of the display device, according to a polarization associated with a lens of stereoscopic glasses worn over the same one eye of the user. Further, as a third step (c) a backlight is activated to illuminate the polarized frame, in response to an entirety of the polarized frame being scanned. Still yet, as a fourth step (d) the display device is held for a predetermined period of time in response to activation of the backlight, and then the backlight is de-activated. Steps (a)-(d) are then repeated for the other eye of the user, with another frame of stereoscopic display content intended for viewing by the other eye.

In other embodiment, as a first step (a) an image frame of stereoscopic display content intended for viewing by one eye of a user and then a black frame are sequentially scanned, using a display layer of a display device. Additionally, as a second step (b) the scanned image frame and the scanned black frame are polarized utilizing a polarizing layer of the display device, according to a polarization associated with a lens of stereoscopic glasses worn over the same one eye of the user, during the scanning of the image frame and the black frame. Further, steps (a)-(b) are repeated for the other eye of the user, with another image frame of stereoscopic display content intended for viewing by the other eye.

In yet another embodiment, as a first step (a) a first instance of a frame of stereoscopic display content intended for viewing by one eye of a user is scanned, using a display layer of a display device. Additionally, as a second step (b) a polarizing layer of the display device is switched according to a polarization associated with a lens of stereoscopic glasses worn over the same one eye of the user to polarize the scanned frame. Further, as a third step (c) a backlight is activated to illuminate the frame being displayed, in response to an entirety of the first instance of the frame being scanned. Still yet, as a fourth step (d) sequential to a vertical blanking interval immediately following the scanning of the first instance of the frame, a second instance of the same frame is scanned. As a fifth step (e) the backlight is kept activated throughout the scan of the second instance of the frame, and then the backlight is de-activated. Moreover, steps (a)-(e) are repeated for the other eye of the user, with another frame of stereoscopic display content intended for viewing by the other eye.

DETAILED DESCRIPTION

Figure 1:
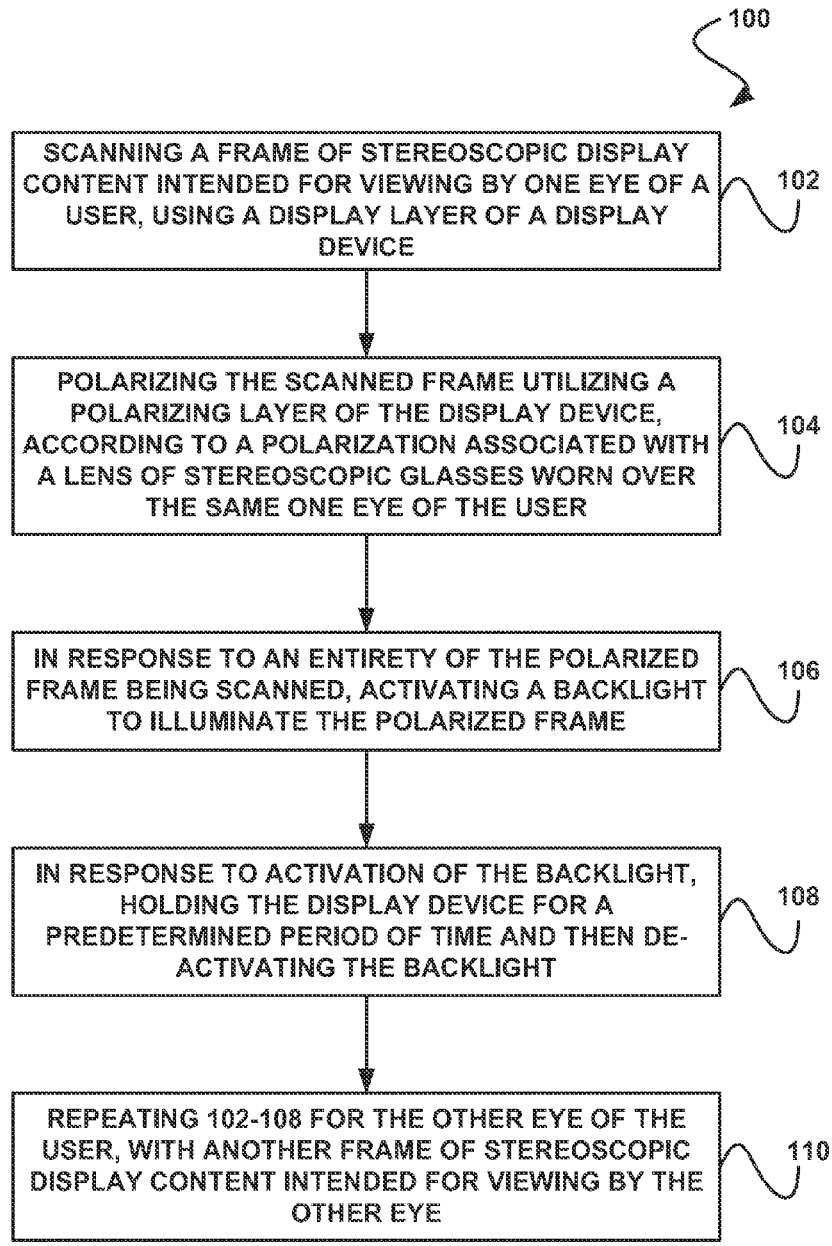
FIG. 1 shows a method for displaying stereoscopic content by activating a backlight to illuminate a polarized frame, in accordance with one embodiment.

FIG. 1 shows a method 100 for displaying stereoscopic content by activating a backlight to illuminate a polarized frame, in accordance with one embodiment. In the present embodiment, the method 100 is performed sequentially for each eye of a user. As shown in operation 102, a frame of stereoscopic display content intended for viewing by one eye of a user is scanned, using a display layer of a display device. In the context of the present description, the display device may include any device capable of displaying stereoscopic display content for viewing by a user.

For example, the display device may include, but is not limited to, a cathode ray tube (CRT) display, a digital light processing (DLP) projector, a liquid crystal display (LCD), a Plasma display, or projection devices using these and other technologies, etc. addition, the display layer used to scan (e.g. output, paint, display, etc.) the frame of stereoscopic content may include pixels or any other component of a layer of the display device capable of being illuminated (e.g. by a backlight, as described below) to display the stereoscopic display content.

To this end, the stereoscopic display content may include images, portions thereof (e.g. pixel information, etc.), and/or anything else capable of being processed for the purpose of being displayed stereoscopically (e.g. three-dimensionally) by the display device to a user. For example, the stereoscopic display content may include a portion (e.g. a first set of frames) intended for viewing by a left eye of the user and a different portion (e.g. a second set of frames) intended for viewing by a right eye of the user. To this end, as noted above, the stereoscopic display content includes at least two frames one for viewing by the left eye and one for viewing by the right eye of a user.

Additionally, as shown in operation 104, the scanned frame is polarized utilizing a polarizing layer of the display device, according to a polarization associated with a lens of stereoscopic glasses worn over the same one eye of the user. In the present description, the polarization layer of the display device may include any layer of the display device other than the display layer. The polarizing layer is capable of polarizing (e.g. rotating, etc.) content output by the display layer of the display device. For example, the polarization layer may include a switchable polarizer to which varying voltages may be applied to change the provided polarity. In various embodiments, the polarization layer may be located behind the display layer or in front of the display layer.

Thus, in the present embodiment, the polarization layer is capable of polarizing the frame scanned by the display layer of the display device. Such polarizing of the frame may include linearly polarizing the frame or circularly polarizing the frame. For example, the method 100 may use two linear polarized orientations with orthogonal direction, or may use a left circular polarized orientation and a right circular polarized orientation. In either case, the frame is polarized according to the polarization (e.g. linear polarization or circular polarization) associated with the lens of stereoscopic glasses worn over the one eye of the user. Specifically, the scanned frame may be polarized such that the polarized scanned frame has a same polarization as the polarization associated with the lens of the stereoscopic glasses worn over the one eye of the user.

In this way, a scanned frame (i.e. that without polarization of the same would not be viewable by the one eye of the user via the stereoscopic glasses) may become viewable by the one eye of the user by virtue of the scanned frame being polarized according to the polarization of the lens of the stereoscopic glasses worn over the one eye of the user. It should be noted that the stereoscopic glasses may include passive stereoscopic glasses, where in particular each lens of the stereoscopic glasses has a different (e.g. opposite) polarization. Accordingly, each eye of a user wearing the stereoscopic glasses may only be capable of viewing content polarized according to the polarization of the associated lens worn over such eye.

Furthermore, a backlight is activated to illuminate the polarized frame, in response to an entirety of the polarized frame being scanned. Note operation 106. The backlight may include any light capable of being activated to illuminate the polarized frame for viewing by the user. In one embodiment, the backlight may be a component of the display device (e.g. situated behind the display layer and optionally behind the polarization layer of the display device). In another embodiment, the backlight may be activated a predetermined amount of time after the entirety of the polarized frame is scanned.

By activating the backlight to illuminate the polarized frame in response to the entirety of the polarized frame being scanned, the one eye of the user may only be capable of viewing the polarized frame via the stereoscopic glasses when the entirety of such frame is scanned. This may prevent the user from viewing the polarized frame prior to the entirety of the same being scanned, such that the user may be prevented from viewing a display of the display layer of the display device which is anything but the entirety of the polarized frame. Just by way of example, the user may be prevented from viewing a portion of a previous frame intended for viewing by the other eye of the user during the overwriting of such previous frame with the frame intended for viewing by the one of the user (i.e. the frame scanned in operation 102).

In a different optional embodiment where the display device does not necessarily operate in conjunction with the backlight, but instead where the pixels of the display device emit light, such as with organic light-emitting diodes (OLED), the pixels themselves may operate in at least a similar manner described above with respect to the backlight (e.g. by similarly activating, or turning on, and deactivating, or turning off, the pixels).

Moreover, the display device is held for a predetermined period of time in response to activation of the backlight, and then the backlight is de-activated. Note operation 108. As shown in operation 110, operations (a)-(d) are then repeated for the other eye of the user, with another frame of stereoscopic display content intended for viewing by the other eye. Optionally, the backlight may be deactivated prior to scanning the other frame intended for viewing by the other eye of the user. As another option, the backlight may be deactivated a predetermined amount of time after a beginning of a scanning of the other frame intended for viewing by the other eye of the user.

In one embodiment, the polarization of the polarizing layer may be switched in response to an entirety of the frame being scanned and may further be held until the backlight is deactivated, such that the frame is polarized with a correct polarization prior to and during the illumination of the frame by the backlight. In another embodiment, the polarization of the polarizing layer may be switched prior to an entirety of the frame being scanned to give the polarizer time to reach the new state, and may further be held until the backlight is deactivated, such that the frame is polarized with a correct polarization prior to and during the illumination of the frame by the backlight. For example, the backlight may be activated only in response to the entirety of the polarized frame being scanned, and the polarizing layer may be switched prior to the entirety of the frame being scanned and therefore prior to the activation of the backlight such that an amount of time provided for the polarizer to complete the switch of the polarization to the correct polarization includes a time during which the frame is being scanned until the activation of the backlight is complete.

Figure 2:
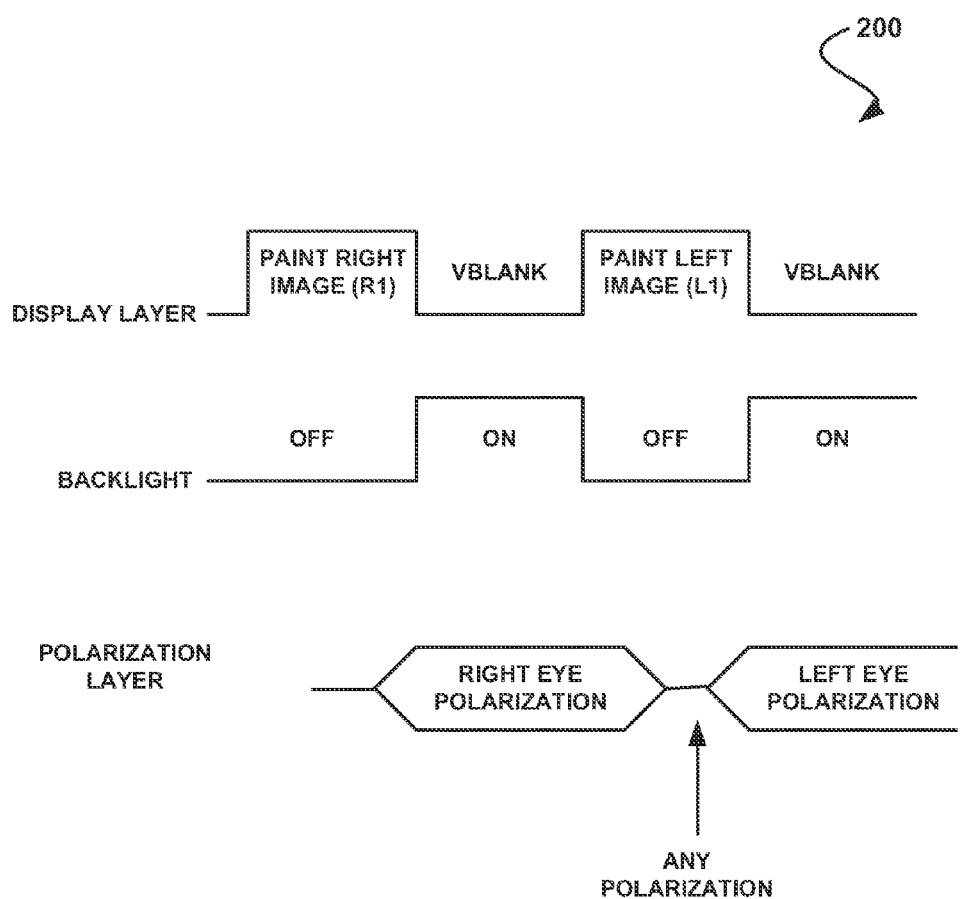
FIG. 2 shows a system for displaying stereoscopic content by activating a backlight to illuminate a polarized frame, in accordance with the embodiment of FIG. 1.

FIG. 2 shows a system 200 for displaying stereoscopic content by activating a backlight to illuminate a polarized frame, in accordance with the embodiment of FIG. 1. As an option, the system 200 may be implemented to carry out the method 100 of FIG. 1. Of course, however, the system 200 may be implemented in any desired environment. It should also be noted that the aforementioned definitions may apply during the present description.

As shown, stereoscopic display content is painted by a display layer of a display device (e.g. system 200), where such stereoscopic display content includes a plurality of frames which are received, and the frames that are received alternate between being intended for viewing by the left eye of the user and those intended for viewing by the right eye of the user. For example, frame L1 may be a frame of the stereoscopic display content intended for viewing by the left eye of the user, frame R1 may be a frame of the stereoscopic display content intended for viewing by the right eye of the user, frame L2 (not shown) may be a frame of the stereoscopic display content intended for viewing by the left eye of the user, and frame R2 may be a frame of the stereoscopic display content intended for viewing by the right eye of the user, and so on.

In such example, the frames may be painted by the display layer in a sequence of R1, L1, R2, L2, and so on. Moreover, a vertical blanking interval exists between the painting of each frame. In one exemplary embodiment, the frames may be painted at 120 Hertz with a 32% or higher vertical blanking interval.

Each painted frame is polarized by a polarization layer of the display device (e.g. system 200), according to a polarization associated with a lens of stereoscopic glasses worn over a respective eye of the user. For example, the frame intended for viewing by a right eye of the user may be polarized according to a polarization associated with a lens of stereoscopic glasses worn over the right eye of the user. Similarly, the L1 frame intended for viewing by a left eye of the user may be polarized according to a polarization associated with a lens of stereoscopic glasses worn over the left eye of the user.

It should be noted that the polarization performed by the polarization layer may be initiated at any desired moment in time allowing for the painted frame to be polarized. In one embodiment, the polarization of the painted frame may be initiated in response to an entirety of the frame being painted (as shown in FIG. 2). In another embodiment, however, the polarization of the painted frame may be initiated prior to an entirety of the frame being painted (not shown), such as during any moment in time in which any portion of the frame is painted.

It should be noted that the painted frame may be polarized at any point in time prior to the illumination by the backlight of the painted frame or at the same moment in time as the illumination by the backlight of the painted frame (as described below). In this way, at the point in time when the frame is illuminated, it may be ensured that the frame is polarized accordingly for viewing by the corresponding eye of the user.

In the embodiment shown, the backlight is activated (for emitting light) in response to an entirety of the frame being painted. For example, once the last scan line of the frame is painted, the backlight may be activated to emit light thereby illuminating the painted frame. Such activation may occur immediately after the last scan line of the frame is painted, or optionally a predetermined amount of time after the entirety of the polarized frame is painted. The predetermined amount of time may be associated with a responsiveness of the system 200, to allow for a time between receiving the last line of the frame and the display layer achieving the new state of having painted the last line of the frame.

Furthermore, the backlight may be deactivated at the start of painting of the next frame or a pre-determined time later. For example, when the display layer is painting over a portion of a previously painted frame intended for viewing by one eye of the user because such previously painted frame is at least partially overwritten by a subsequent frame being painted that is intended for viewing by the other eye of the user, the backlight may be deactivated. This may prevent the user from viewing output of the display layer that is anything other than an entirety of a frame. As an option, the backlight can be activated with more current to get more brightness, since the backlight is only activated part of the time. This may be accomplished, for example, using the NVIDIA® 3D LightBoost™ technology, which is described with respect to the backlight activation techniques described in U.S. patent application Ser. No. 11/462,535, filed Aug. 4, 2006 and entitled "System, Method, And Computer Program Product For Increasing An LCD Display Vertical Blanking Interval," by Slavenburg et al., which is hereby incorporated by reference in its entirety.

By activating the backlight such that only an entirety of a polarized frame is illuminated for viewing by the user, full resolution stereoscopic viewing may be achieved with passive glasses. It should be noted that various processing of the frame may be provided prior to the painting of the same. For example, compensation for crosstalk may be provided, as described in U.S. patent application Ser. No. 11/463,277, filed Aug. 8, 2006, and entitled "System, Method, And Computer Program Product For Compensating For Crosstalk During The Display Of Stereo Content," by Slavenburg et al., which is hereby incorporated by reference in its entirety. As another example, position dependent overdrive may be provided, as described in U.S. patent application Ser. No. 12/901,447, filed Oct. 8, 2010, and entitled "System, Method, And Computer Program Product For Utilizing Screen Position Of Display Content To Compensate For Crosstalk During The Display Of Stereo Content," by Gerrit A. Slavenburg, which is hereby incorporated by reference in its entirety.

As further examples, increased VBI or content buffering may be provided for increasing a stable time during which the painted frame is held and displayed by the display device, as described for example with respect to U.S. patent application Ser. No. 11/462,535, filed Aug. 4, 2006 and entitled "System, Method, And Computer Program Product For Increasing An LCD Display Vertical Blanking Interval," by Slavenburg et al., which is hereby incorporated by reference in its entirety. In particular, with respect to the increased VBI, a VBI associated with the stereoscopic display content may be increased for increasing a length of time during which the frame is held on the display device. Additionally, with respect to the content buffering, the frame of stereoscopic display content may be scanned from a buffer for reducing cable bandwidth of the display device and/or for increasing a length of time the frame is held on the display device to further increase brightness of the display device when displaying the frame.

Figure 3:
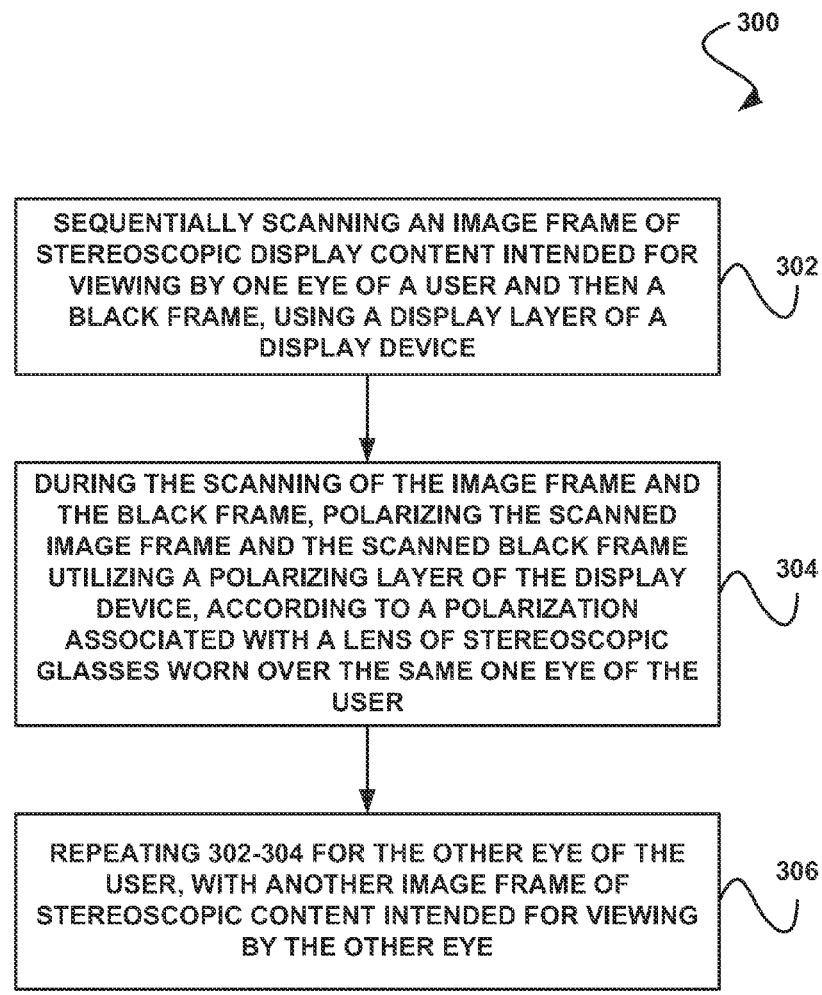
FIG. 3 shows a method for displaying stereoscopic content by polarizing sequential image frames and black frames, in accordance with another embodiment.

FIG. 3 shows a method 300 for displaying stereoscopic content by polarizing sequential image frames and black frames, in accordance with another embodiment. Again, it should also be noted that the aforementioned definitions may apply during the present description. In addition, in the present embodiment, the method 300 is performed sequentially for each eye of a user.

As shown in operation 302, an image frame of stereoscopic display content intended for viewing by one eye of a user and then a black frame are sequentially scanned, using a display layer of a display device. It should be noted that such display device may not necessarily be configured to include the backlight described above with respect to FIGS. 1 and/or 2).

As noted above, the black frame is scanned sequential to the image frame. For example, a vertical blanking interval may follow the scanning of the image frame and the black frame may be scanned following that vertical blanking interval. In the present embodiment, the black frame may include any frame having all black content (i.e. all black pixels). In one embodiment, a vertical blanking interval may follow the scanning of the image frame and the black frame may be scanned following the vertical blanking interval.

Moreover, the scanned image frame and the scanned black frame are polarized utilizing a polarizing layer of the display device, according to a polarization associated with a lens of stereoscopic glasses worn over the same one eye of the user, during the scanning of the image frame and the black frame. Note operation 304. Specifically, the scanned image frame and the black frame may be polarized such that the polarized scanned frame and the polarized black frame have a same polarization as the polarization associated with the lens of the stereoscopic glasses worn over the one eye of the user.

In this way, by virtue of the black frame, a viewer may be prevented from viewing a previously scanned image frame when a current image frame is being scanned. In particular, prior to the scanning of each image frame, a black frame may be scanned, such that during scanning of the image frame only the black frame may be overwritten, thus avoiding a situation where a viewer is shown one image frame intended for one eye being overwritten by a next image frame intended for viewing by the other eye, Operations 302-304 are repeated for the other eye of the user, with another image frame of stereoscopic display content intended for viewing by the other eye. Note operation 306.

By scanning the black frame subsequent to the image frame, and furthermore polarizing both the scanned image frame and the scanned black frame, during display of the image frame a user may be prevented from viewing a previously scanned image frame intended for viewing by the other eye of the user. In particular, when an image frame is being scanned, the display layer may only be overwriting a previously scanned black frame with the image frame, such that a user viewing the image frame during scanning thereof will only see previously scanned black frame as it is overwritten by the image frame.

In one embodiment, during the scanning of the image frame and the scanning of the black frame, the image frame and the black frame maybe polarized with a correct polarization for the intended eye. For example, for operation 304 with respect to the one eye, the polarizing layer may be switched according to the polarization associated with the lens of stereoscopic glasses worn over the one eye of the user prior to the scanning of the image frame and the black frame, and wherein for operation 304 with respect to the other eye, the polarizing layer may be switched according to the polarization associated with the lens of stereoscopic glasses worn over the other eye of the user prior to the scanning of the other image frame and subsequent black frame. Optionally, the polarizing layer may be switched during a vertical blanking interval preceding the scanning of the image frame. As another option, the polarizing layer may be switched a predetermined amount of time following the initiation of the vertical blanking interval preceding the scanning of a next image frame intended for viewing by the another eye of the user.

Figure 4:
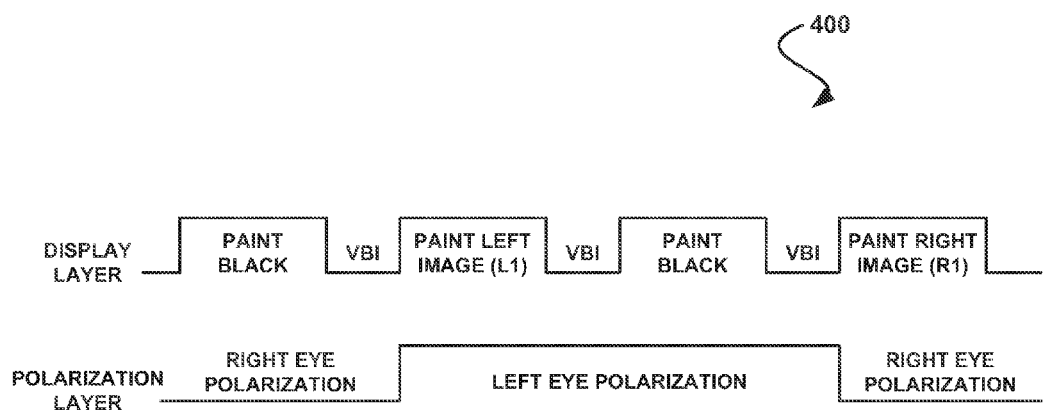
FIG. 4 shows a system for displaying stereoscopic content by polarizing sequential image frames and black frames, in accordance with the embodiment of FIG. 3.

FIG. 4 shows a system 400 for displaying stereoscopic content by polarizing sequential image frames and black frames, in accordance with the embodiment of FIG. 3. As an option, the system 400 may be implemented to carry out the method 300 of FIG. 3. Of course, however, the system 400 may be implemented in any desired environment. It should also be noted that the aforementioned definitions may apply during the present description.

As shown, stereoscopic display content is painted by a display layer of a display device (e.g. system 400), where such stereoscopic display content includes a plurality of frames which are received, and the frames that are received alternate between being intended for viewing by the left eye of the user and intended for viewing by the right eye of the user. For example, frame L1 may be a frame of the stereoscopic display content intended for viewing by the left eye of the user, frame R1 may be a frame of the stereoscopic display content intended for viewing by the right eye of the user, frame L2 (not shown) may be a frame of the stereoscopic display content intended for viewing by the left eye of the user, and frame R2 may be a frame of the stereoscopic display content intended for viewing by the right eye of the user, and so on.

Moreover, a black frame is received between each image frame (L1, R1, etc.) described above. Thus, the frames may be painted by the display layer as received, namely in a sequence of L1, Black, R1. Black, L2, Black, R2, Black, and so on. In addition, a vertical blanking interval exists between the painting of each frame.

Each painted frame is polarized by a polarization layer of the display device (e.g. system 400), according to a polarization associated with a lens of stereoscopic glasses worn over a respective eye of the user. For example, the L1 frame intended for viewing by a left eye of the user and the subsequently painted black frame may be polarized according to a polarization associated with a lens of stereoscopic glasses worn over the left eye of the user. Similarly, the R1 frame intended for viewing by a right eye of the user and the subsequently painted black frame may be polarized according to a polarization associated with a lens of stereoscopic glasses worn over the right eye of the user. In this way, an entirety of the painted image frame and an entirety of the painted black frame may be polarized.

By incorporating a black frame between each image frame, an image frame may be written over a black frame, such that a user viewing the image frame during writing of the same to the display layer (i.e. prior to an entirety of such frame being written) may only view a partial black frame and the written portion of the image frame. In this way, the incorporation of the black frames as described above may prevent the user from viewing a portion of previously displayed image frame (i.e. intended for one eye of the user) being overwritten by a subsequent image frame (i.e. intended for the other eye of the user).

In one embodiment, the polarization layer may be activated according to the polarization of the lens worn over the eye of the user for which the painted image frame is intended, prior to the painting of the image frame and the subsequent black frame (e.g. during a vertical blanking interval immediately preceding the painting of the image frame). As an option, the polarization layer may be activated a predetermined amount of time following the initiation of the vertical blanking interval preceding the painting of the image frame (i.e. the vertical blanking interval immediately prior to the initiation of the painting of the image frame). In another embodiment, the polarization layer may be activated according to the polarization of the lens worn over the eye of the user for which the painted image frame is intended, in response to a last black scan line of a previous black frame being painted.

By painting a black frame between each image frame, and polarizing the image frame and subsequent black frame, in the manner as described above, full resolution stereoscopic viewing may be achieved with passive glasses. Again, it should be noted that various processing of the image frame may be provided prior to the painting of the same. For example, compensation for crosstalk in the stereoscopic content may be provided, as described in U.S. patent application Ser. No. 11/463,277, filed Aug. 8, 2006, and entitled "System, Method, And Computer Program Product For Compensating For Crosstalk During The Display Of Stereo Content," by Slavenburg et al., which is hereby incorporated by reference in its entirety.

As another example, content buffering may be provided for increasing a stable time during which the painted frame is held and displayed by the display device and further for minimizing display cable bandwidth, as described for example with respect to U.S. patent application Ser. No. 11/462,535, filed Aug. 4, 2006 and entitled "System, Method, And Computer Program Product For Increasing An LCD Display Vertical Blanking Interval," by Slavenburg et al., which is hereby incorporated by reference in its entirety. In particular, the image frame may be sent by the source device into an image buffer (e.g. in the display device). Then when the image is (e.g. almost) complete, the image frame may be transmitted from the image buffer to the display layer very fast. This may achieve the painting of the image frame, as well as the VBI and the painting of the black frame within a time associated with for example 120 Hz.

Figure 5:
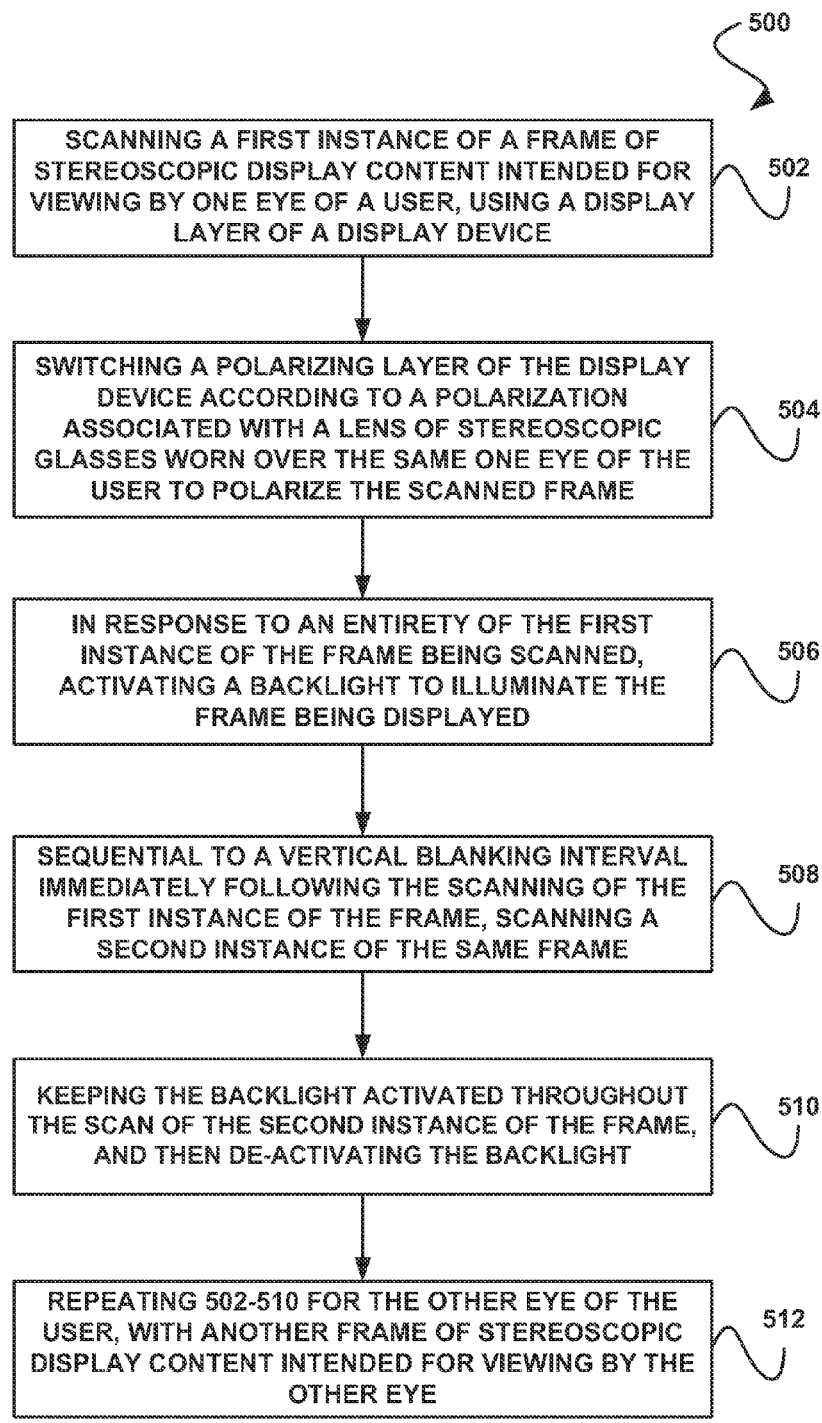
FIG. 5 shows a method for displaying stereoscopic content by activating a backlight to illuminate an extended display of a polarized frame, in accordance with yet another embodiment.

FIG. 5 shows a method 500 for displaying stereoscopic content by activating a backlight to illuminate an extended display of a polarized frame, in accordance with yet another embodiment. Again, it should also be noted that the aforementioned definitions may apply during the present description. In the present embodiment, the method 500 is performed for each eye of a user.

As shown in operation 502, a first instance of a frame of stereoscopic display content intended for viewing by one eye of the user is scanned, using a display layer of a display device. The first instance may be a first received instance of the frame. For example, the first instance may be an originally received frame.

Additionally, a polarizing layer of the display device is switched according to a polarization associated with a lens of stereoscopic glasses worn over the same one eye of the user to polarize the scanned frame. Note operation 504. The method 500 may use a left circular polarized orientation and a right circular polarized orientation, or as another option may use two linear polarized orientations with orthogonal direction.

It should be noted that polarization of the scanned frame (i.e. according to the polarization associated with the lens of stereoscopic glasses worn over the one of the user) may be initiated at any point in time prior to the illumination by the backlight of the scanned frame, as described below. In this way, at the point in time when the frame is illuminated, it may be ensured that the frame is polarized accordingly for viewing by the corresponding eye of the user. In one embodiment, the polarization of the polarizing layer may be switched in response to an entirety of the first instance of the frame being scanned. In another embodiment, the polarization of the polarizing layer may be switched prior to an entirety of the first instance of the frame being scanned.

Further, as shown in operation 506, a backlight is activated to illuminate the frame being displayed, in response to an entirety of the first instance of the frame being scanned. In one embodiment, the backlight may be activated in response to an end of the scanning (e.g. an output of a last scan line) of the first instance of the frame. Such activation may occur immediately after the end of the scanning (e.g. a scanning of a last scan line) of the first instance of the frame, or optionally a predetermined amount of time after the end of the scanning of the first instance of the frame (e.g. after the entirety of the first instance of the frame is scanned). The predetermined amount may be associated with a responsiveness of the display device, such as a responsiveness of the display layer from a time at which the last scan line of the first instance of the frame is received for scanning to a time at which the display changes to the new state.

Still yet, as shown in operation 508, sequential to a vertical blanking interval immediately following the scanning of the first instance of the frame, a second instance of the same frame is scanned. The scanning of the second instance of the frame may be immediately sequential to the vertical blanking interval.

The second instance of the frame may be a second received instance of the frame, a copy of the originally received frame, etc. For example, the first instance of the frame may be duplicated to form at least one additional (i.e. second) instance of the first instance of the frame. Duplicating the at least one frame may include creating a copy, replica, etc. of the frame. Thus, the received frame of the stereoscopic display content may be duplicated, such that at least two instances of the frame of the stereoscopic display content exist. Of course, as another option, the frame may be stored in memory (e.g. a buffer) and scanned at least twice, once as the first instance of the frame and at least a second time as the additional instance of the frame.

Further, as shown in operation 510, the backlight is kept activated throughout the scan of the second instance of the frame, and then the backlight is de-activated. Thus, the backlight may be held in the activated state while the entirety of the frame is being displayed. For example, the backlight may be held in the activated state from the point in time in which the entirety of the first instance of the frame is painted, during the time when the second instance of the frame is painted, and until the time immediately before a start of a first instance of a next frame is painted (or optionally a predetermined amount of time thereafter), namely the painting of a first scan line of such first instance of the next frame. Thus, anytime in which anything other than an entirety of a frame is being painted (e.g. a frame intended for viewing by one eye of a user is being overwritten by another eye of the user), the backlight may be deactivated to prevent the one eye of the user from viewing any part of the frame intended for the other eye of the user. As an option, the backlight can be activated with more current to get more brightness, since the backlight is only activated part of the time. This may be accomplished, for example, using the NVIDIA® 3D LightBoost™.

In one embodiment where the polarization of the polarizing layer is switched in response to an entirety of the first instance of the frame being scanned, the polarization may be held until the backlight is deactivated, such that the first instance and the second instance of the frame is polarized with a correct polarization prior to and during the illumination of the first instance of the frame by the backlight. In another embodiment where the polarization of the polarizing layer is switched prior to an entirety of the first instance of the frame being scanned, the polarization may be held until the backlight is deactivated, such that the first instance and the second instance of the frame is polarized with a correct polarization prior to and during the illumination of the frame by the backlight. As noted above, the backlight is activated only in response to the entirety of the first instance of the polarized frame being scanned such that an amount of time provided for the polarizer to switch the polarization to the correct polarization includes a time during which the first instance of the frame is being scanned and a time during which the backlight is being activated.

Moreover, as shown in operation 512, operations 502-510 are repeated for the other eye of the user, with another frame of stereoscopic display content intended for viewing by the other eye. By activating the backlight such that only an entirety of a polarized frame is illuminated for viewing by the user, full resolution stereoscopic viewing may be achieved with passive glasses. It should be noted that various processing of the frame may be provided prior to the scanning of the same. For example, compensation for crosstalk may be provided, as described in U.S. patent application Ser. No. 11/463, 277, filed Aug. 8, 2006, and entitled "System, Method, And Computer Program Product For Compensating For Crosstalk During The Display Of Stereo Content," by Slavenburg et al., which is hereby incorporated by reference in its entirety. As another example, position dependent overdrive may be provided for processing the first instance of the frame and the second instance of the frame prior to the scanning thereof, as described in U.S. patent application Ser. No. 12/901,447, filed Oct. 8, 2010, and entitled "System, Method, And Computer Program Product For Utilizing Screen Position Of Display Content To Compensate For Crosstalk During The Display Of Stereo Content," by Gerrit A, Slavenburg, which is hereby incorporated by reference in its entirety.

As a further example, content buffering may be provided for increasing a stable time during which the painted frame is held and displayed by the display device and further for minimizing display cable bandwidth, as described for example with respect to U.S. patent application Ser. No. 11/462,535, filed Aug. 4, 2006 and entitled "System, Method, And Computer Program Product For Increasing An LCD Display Vertical Blanking Interval," by Slavenburg et al., which is hereby incorporated by reference in its entirety. In particular, the first instance of the frame and the second instance of the frame may be scanned from a buffer for reducing cable bandwidth of the display device and/or for increasing a length of time the first instance of the frame and the second instance of the frame are held on the display device to further increase brightness of the display device when displaying the first instance of the frame and the second instance of the frame.

Figure 6:
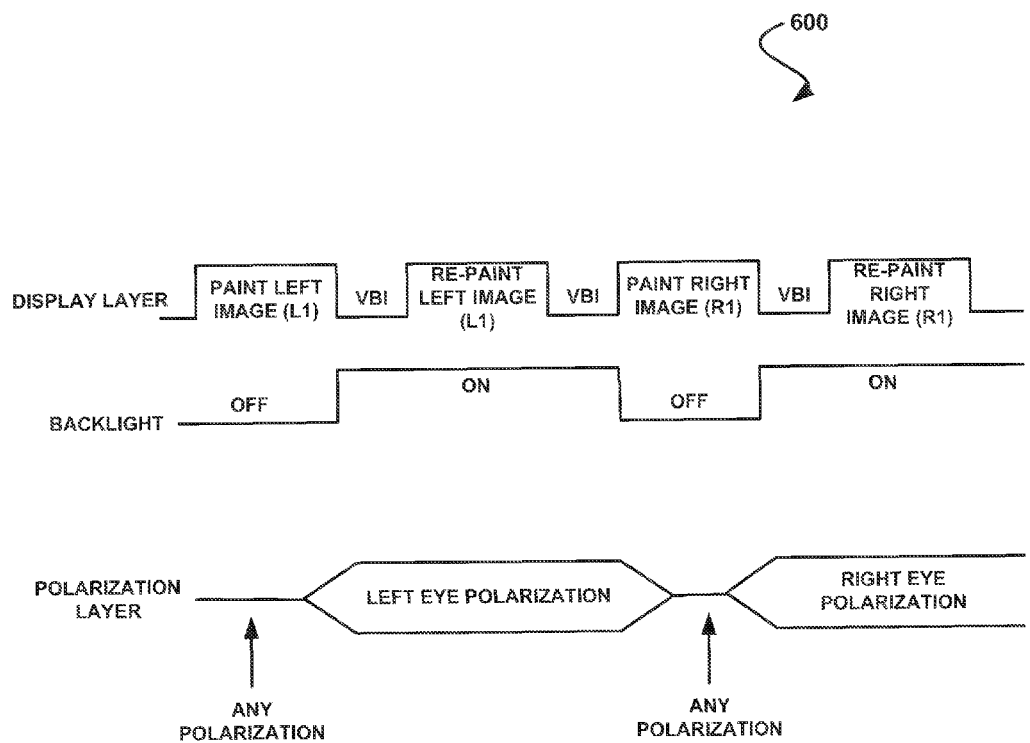
FIG. 6 shows a system for displaying stereoscopic content by activating a backlight to illuminate an extended display of a polarized frame, in accordance with the embodiment of FIG. 5.

FIG. 6 shows a system 600 for displaying stereoscopic content by activating a backlight to illuminate an extended display of a polarized frame, in accordance with the embodiment of FIG. 5. As an option, the system 600 may be implemented to carry out the method 500 of FIG. 5. Of course, however, the system 600 may be implemented in any desired environment. It should also be noted that the aforementioned definitions may apply during the present description.

In the embodiment shown, stereoscopic display content is painted by a display layer of a display device (e.g. system 600), where such stereoscopic display content includes a plurality of frames which are received, and the frames that are received include duplicate frames that alternate between being intended for viewing by the left eye of the user and intended for viewing by the right eye of the user. For example, frame L1 may be a frame of the stereoscopic display content intended for viewing by the left eye of the user, frame R1 may be a frame of the stereoscopic display content intended for viewing by the right eye of the user, frame L2 (not shown) may be a frame of the stereoscopic display content intended for viewing by the left eye of the user, and frame R2 may be a frame of the stereoscopic display content intended for viewing by the right eye of the user, and so on.

Thus, the frames may be painted by the display layer in duplicates as received, namely in a sequence of L1, L1, R1, R1, L2, L2, R2, R2, and so on. In addition, a vertical blanking interval exists between the painting of each frame. By duplicating the each frame as described above, viewing at 240 Hertz or higher may be achieved.

Each painted frame is polarized by a polarization layer of the display device (e.g. system 600), according to a polarization associated with a lens of stereoscopic glasses worn over a respective eye of the user. For example, the first instance of the L1 frame intended for viewing by a left eye of the user and the subsequently painted second instance of the L1 frame may be polarized according to a polarization associated with a lens of stereoscopic glasses worn over the left eye of the user. Similarly, the first instance of the R1 frame intended for viewing by a right eye of the user and the subsequently painted second instance of the R1 frame may be polarized according to a polarization associated with a lens of stereoscopic glasses worn over the right eye of the user.

Such polarization may be initiated at any point in time prior to the activation of the backlight, to ensure that at the point in time when the frame is illuminated by the backlight, the frame being painted by the display layer is polarized accordingly for viewing by the corresponding eye of the user. In the embodiment shown, the polarization is initiated in response to an entirety of the first instance of the frame (e.g. L1) being painted, such as immediately after a last scan line of the first instance of the frame being painted by the display layer of the display device (e.g. system 600). Similarly, the backlight is also activated in response to the entirety of the first instance of the frame (e.g. L1) being painted, namely after the initiation of the polarization of such frame. It should be noted that the activation of the backlight may be delayed from the time frames described above by a predetermined time period (e.g. to allow for a responsiveness of the display layer between receiving a scan line of a frame and completing a painting of the same).

The backlight is held in the activated state while the entirety of the frame is being displayed. As shown, the backlight is held in the activated state from the point in time in which the entirety of the first instance of the frame is painted, during the time when the second instance of the frame is painted, and until the time immediately before a start of a first instance of a next frame (e.g. R1, as shown) is painted, namely the painting of a first scan line of such first instance of the next frame. Thus, anytime in which anything other than an entirety of a frame is being painted (e.g. a frame intended for viewing by one eye of a user is being overwritten by another eye of the user), the backlight may be deactivated to prevent the one eye of the user from viewing any part of the frame intended for the other eye of the user.

Still yet, by controlling the operation of the backlight in the manner described above, a same brightness may be achieved as with the techniques described with respect to FIGS. 3 and 4, but with about half of the backlight energy being utilized by such techniques. As another option, a higher current may be applied to the backlight when in the activated state to approximately double the brightness of the techniques described with respect to FIGS. 3 and 4, while using at least approximately the same backlight energy being utilized by such techniques described with respect to FIGS. 3 and 4.

Figure 7:
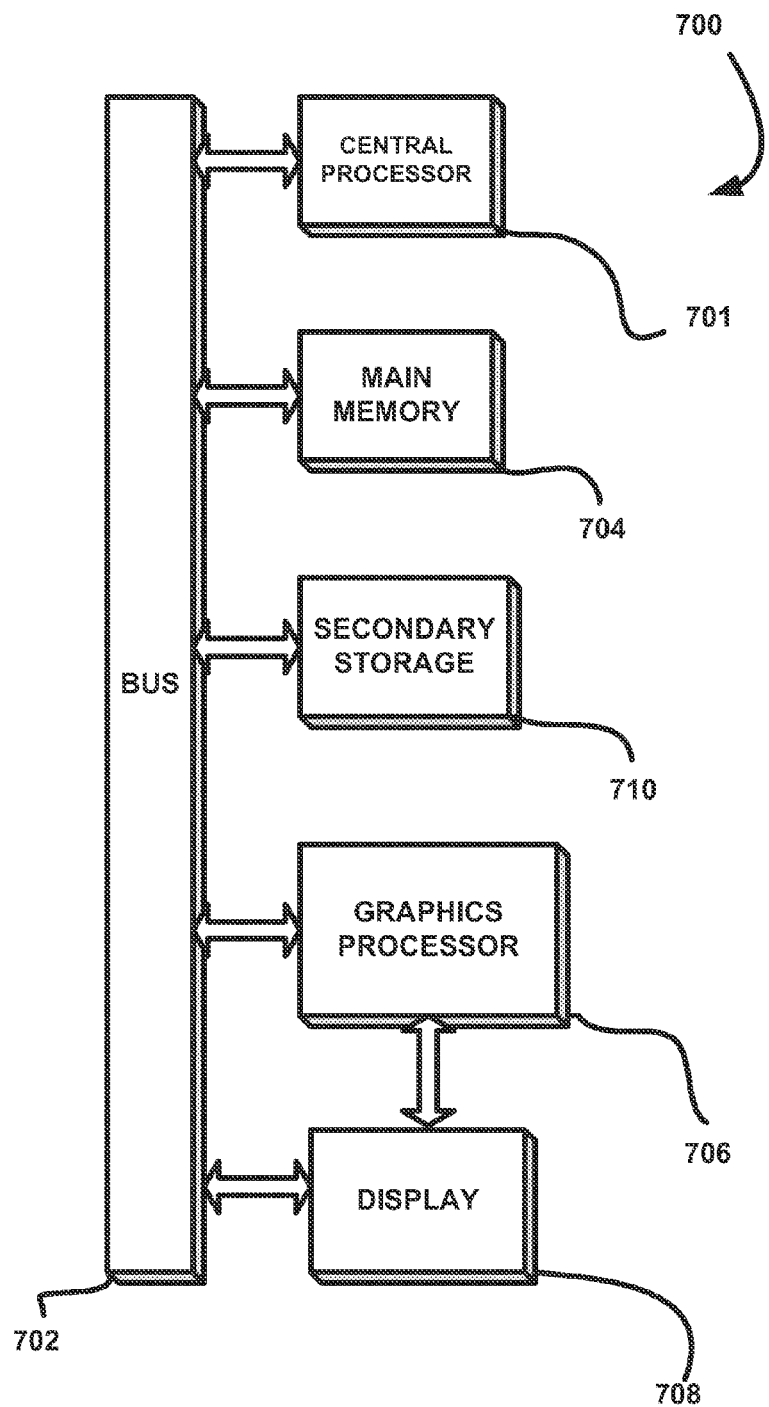
FIG. 7 shows an exemplary system in which the various architecture and/or functionality of the various previous embodiments may be implemented.

FIG. 7 illustrates an exemplary system 700 in which the various architecture and/or functionality of the various previous embodiments may be implemented. As shown, a system 700 is provided including at least one host processor 701 which is connected to a communication bus 702. The system 700 also includes a main memory 704. Control logic (software) and data are stored in the main memory 704 which may take the form of random access memory (RAM).

The system 700 also includes a graphics processor 706 and a display 708, i.e. a computer monitor. In one embodiment, the graphics processor 706 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 704 and/or the secondary storage 710. Such computer programs, when executed, enable the system 700 to perform various functions. Memory 704, storage 710 and/or any other storage are possible examples of computer-readable media.

In one embodiment, the architecture and/or functionality of the various previous figures may be implemented in the context of the host processor 701, graphics processor 706, an integrated circuit (not shown) that is capable of at least a portion of the capabilities of both the host processor 701 and the graphics processor 706, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 700 may take the form of a desktop computer, lap-top computer, and/or any other type of logic. Still yet, the system 700 may take the form of various other devices including, but not limited to a personal digital assistant (PDA) device, a mobile phone device, a television, etc.

Further, while not shown, the system 700 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method comprising:
displaying a first frame of stereoscopic display content on a display layer of a display device, wherein the display layer includes a plurality of pixels of the display device;
polarizing a polarizing layer of the display device according to a first polarization associated with a first lens worn over a first eye of a user in response to displaying an entirety of the first frame of stereoscopic display content on the display layer of the display device, wherein the first lens is included in a pair of stereoscopic glasses worn by the user;
activating a backlight to illuminate the first frame of stereoscopic display content displayed by the display layer in response to polarizing the polarizing layer according to the first polarization;
displaying a first black frame on the display layer of the display device after a first vertical blanking interval that immediately follows displaying the first frame of stereoscopic display content, wherein the polarizing layer remains polarized according to the first polarization while both the first frame of stereoscopic display content and the first black frame are displayed by the display layer;
deactivating the backlight after a first pre-determined period of time after activating the backlight, wherein the backlight is deactivated while the first black frame is displayed;
displaying a second frame of stereoscopic display content on the display layer of the display device;
polarizing the polarizing layer of the display device according to a second polarization associated with a second lens worn over a second eye of the user in response to displaying an entirety of the second frame of stereoscopic display content on the display layer of the display device, wherein the second lens is included in the pair of stereoscopic glasses worn by the user;
activating the backlight to illuminate the second frame of stereoscopic display content displayed by the display layer in response to polarizing the polarizing layer according to the second polarization;
displaying a second black frame on the display layer of the display device after a second vertical blanking interval that immediately follows displaying the second frame of stereoscopic display content, wherein the polarizing layer remains polarized according to the second polar- ization while both the second frame of stereoscopic display content and the second black frame are displayed by the display layer; and deactivating the backlight after a second pre-determined period of time after activating the backlight, wherein the backlight is deactivated while the second black frame is displayed, wherein the first lens prevents the first eye of the user from viewing the second frame of stereoscopic display content and the second lens prevents the second eye of the user from viewing the first frame of stereoscopic display content.

2. The method of claim 1, wherein the first frame of stereoscopic display content, the first black frame, the second frame of stereoscopic display content, and the second black frame are displayed on the display device at a refresh rate of 120 Hertz (Hz).

3. The method of claim 1, wherein the first polarization is a left circular polarized orientation and the second polarization is a right circular polarized orientation.

4. The method of claim 1, wherein the first polarization is a first linear orientation and the second polarization is a second linear orientation that is orthogonal to the first linear orientation.

5. The method of claim 1, wherein at least one of the first frame of stereoscopic display content and the second frame of stereoscopic display content is processed to compensate for crosstalk.

6. The method of claim 1, wherein the polarization of the polarizing layer is switched from the first polarization to the second polarization only while the backlight is deactivated.

7. The method of claim 1, wherein the backlight is activated a third pre-determined period of time after the entirety of the first frame of stereoscopic display content is displayed, and wherein the backlight is activated a fourth pre-determined period of time after the entirety of the second frame of stereoscopic display content is displayed.

8. The method of claim 1, wherein at least one of the first frame of stereoscopic display content and the second frame of stereoscopic display content is processed to provide position dependent overdrive.

9. The method of claim 1, wherein at least one of the first frame of stereoscopic display content and the second frame of stereoscopic display content is scanned from a buffer included in the display device.

10. The method of claim 1, further comprising:

displaying a second instance of the first frame of stereoscopic display content on the display layer of the display device after a first vertical blanking interval that immediately follows displaying the first frame of stereoscopic display content, wherein the polarizing layer remains polarized according to the first polarization while both the first frame of stereoscopic display content and the second instance of the first frame of stereoscopic display content are displayed by the display layer; and displaying a second instance of the second frame of stereoscopic display content on the display layer of the display device after a second vertical blanking interval that immediately follows displaying the second frame of stereoscopic display content, wherein the polarizing layer remains polarized according to the second polarization while both the second frame of stereoscopic display content and the second instance of the second frame of stereoscopic display content are displayed by the display layer.

11. The method of claim 10, wherein the first pre-determined period of time causes the backlight to be deactivated after an entirety of the second instance of the first frame of stereoscopic display content has been displayed, and wherein the second pre-determined period of time causes the backlight to be deactivated after an entirety of the second instance of the second frame of stereoscopic display content has been displayed.

\* \* \* \* \*